US012244241B2

(12) United States Patent
Richards et al.

(10) Patent No.: US 12,244,241 B2
(45) Date of Patent: Mar. 4, 2025

(54) ELECTRICAL WIRING DEVICE FOR DELIVERING POWER TO MULTIPLE MOBILE DEVICES

(71) Applicant: Pass & Seymour, Inc., Syracuse, NY (US)

(72) Inventors: Jeffrey C. Richards, Baldwinsville, NY (US); Collin C. Richards, Baldwinsville, NY (US); Patrick J. Murphy, Marcellus, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 18/469,626

(22) Filed: Sep. 19, 2023

(65) Prior Publication Data

US 2024/0007017 A1    Jan. 4, 2024

Related U.S. Application Data

(63) Continuation of application No. 18/145,054, filed on Dec. 22, 2022, now Pat. No. 11,764,701, which is a continuation of application No. 17/222,367, filed on Apr. 5, 2021, now Pat. No. 11,539,306.

(60) Provisional application No. 63/004,862, filed on Apr. 3, 2020.

(51) Int. Cl.
| | | |
|---|---|---|
| *H02M 7/217* | (2006.01) | |
| *H02J 7/00* | (2006.01) | |
| *H02M 3/155* | (2006.01) | |
| *H02M 7/00* | (2006.01) | |

(52) U.S. Cl.
CPC .......... *H02M 7/217* (2013.01); *H02J 7/0042* (2013.01); *H02M 3/155* (2013.01); *H02M 7/003* (2013.01)

(58) Field of Classification Search
CPC .... H02M 7/217; H02M 7/003; H02M 7/0042; H02M 3/155
See application file for complete search history.

(56) References Cited

U.S. PATENT DOCUMENTS

| | | | | |
|---|---|---|---|---|
| 2014/0347005 | A1* | 11/2014 | Zhou | H02M 7/23 320/137 |
| 2020/0091758 | A1* | 3/2020 | Jahan | H02J 7/02 |
| 2021/0159770 | A1* | 5/2021 | Yeh | H02M 1/0048 |
| 2023/0361580 | A1* | 11/2023 | Kang | H02J 7/345 |
| 2024/0022102 | A1* | 1/2024 | Notohamiprodjo | G06F 1/24 |

* cited by examiner

*Primary Examiner* — Alfonso Perez Borroto
*Assistant Examiner* — Esayas G Yeshaw
(74) *Attorney, Agent, or Firm* — Bond, Schoeneck & King, PLLC; Frederick J. M. Price

(57) ABSTRACT

An electrical wiring device for delivering power to multiple mobile devices including: a housing having a faceplate; a first power delivery port accessible through the faceplate; a second power delivery accessible through the faceplate; an AC/DC converter disposed in the housing and configured to receive an AC signal from a connection to a source of AC mains power and to output a DC signal; a first DC/DC converter disposed in the housing and configured to receive the DC signal and provide a first DC output signal having a first power to a first power delivery port; a second DC/DC converter disposed in the housing and configured to receive the DC signal and provide a second DC output signal having a second power to a second power delivery port; wherein the first DC output signal is different from the second DC output signal.

9 Claims, 13 Drawing Sheets

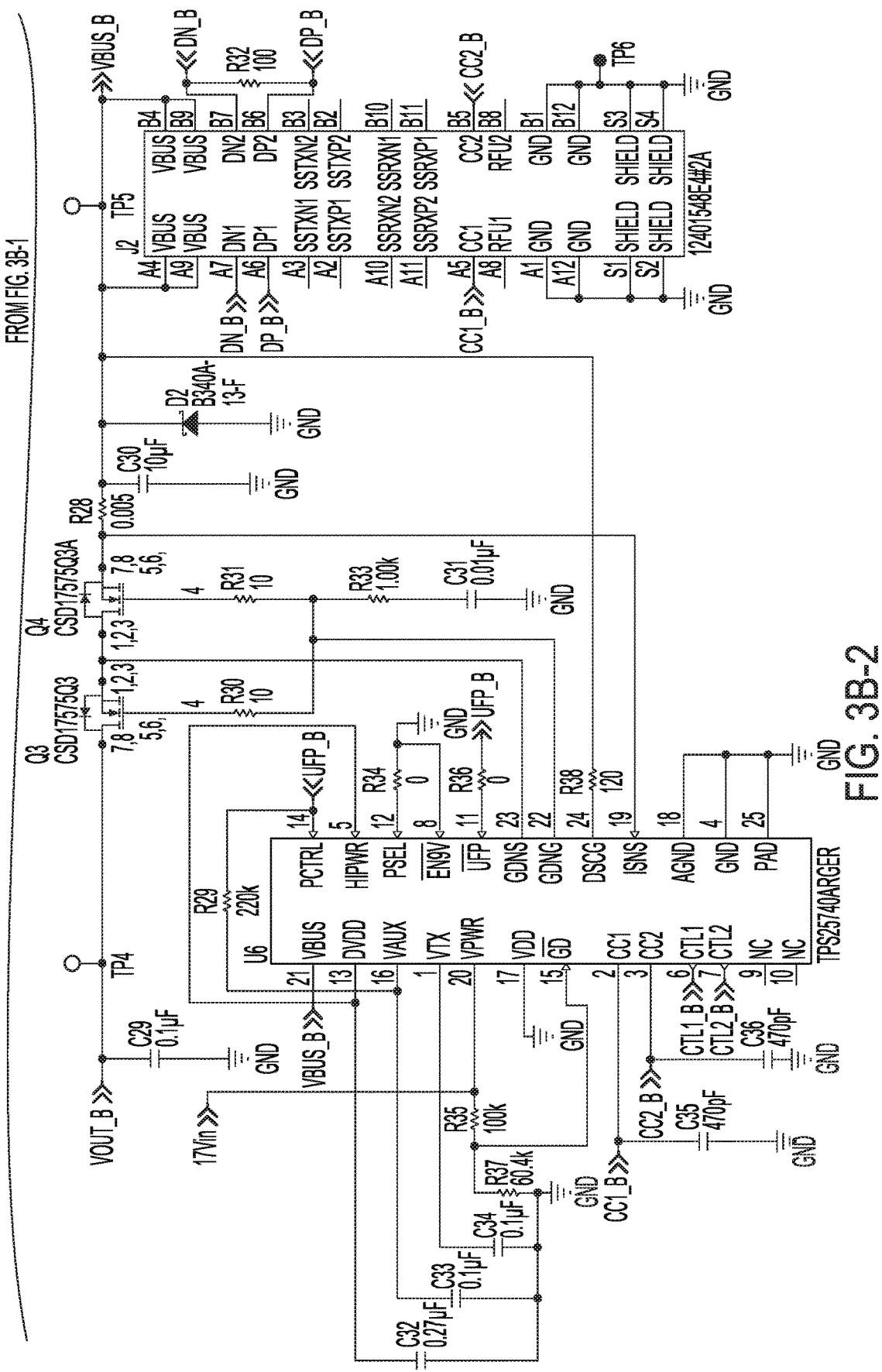

ELECTRICAL WIRING DEVICE FOR DELIVERING POWER TO MULTIPLE MOBILE DEVICES

CROSS REFERENCE TO RELATED APPLICATIONS

The present application is a continuation of U.S. patent application Ser. No. 18/145,054 filed on Dec. 22, 2022 (now U.S. patent Ser. No. 11/764,701), which is a continuation of U.S. patent application Ser. No. 17/222,367 filed on Apr. 5, 2021 (now U.S. patent Ser. No. 11/539,306) which claims priority to and the benefit of U.S. Provisional Patent Application No. 63/004,862, filed on Apr. 3, 2020, the entirety of which is incorporated herein by reference.

FIELD OF THE INVENTION

This invention, in general, relates to electrical wiring devices and, in particular, to electrical wiring devices with power delivery ports for charging mobile devices.

BACKGROUND

The ubiquity of mobile devices has made ready access to charging ports a basic requirement in corporate and residential settings. But use of plug-in power adapters is undesirable because they occupy one receptacle and, sometimes, cover another receptacle, rendering both unusable for other devices. Given the widespread need for charging ports, and the variety of mobile devices in use, there exists the need in the art for an electrical wiring device with multiple dedicated charging ports that can provide independent power levels in accordance with the demands of the connected devices and the maximum available power.

SUMMARY

According to an aspect, an electrical wiring device for delivering power to multiple mobile devices includes: a housing having a faceplate; a first power delivery port accessible through the faceplate; a second power delivery accessible through the faceplate; an AC/DC converter disposed in the housing and configured to receive an AC signal from a connection to a source of AC mains power and to output a DC signal; a first DC/DC converter disposed in the housing and configured to receive the DC signal and provide a first DC output signal having a first power to a first power delivery port; a second DC/DC converter disposed in the housing and configured to receive the DC signal and provide a second DC output signal having a second power to a second power delivery port; wherein the first DC output signal is different from the second DC output signal.

In an example, the electrical wiring device further includes a controller configured to control the first DC/DC converter to vary the DC output signal and the second DC/DC converter to vary the second DC output signal.

In an example, the controller comprises a first source controller configured to control the first DC/DC converter to vary the DC output signal and a second source controller configured to control the second DC/DC converter to vary the second DC output signal.

In an example, the first source controller is configured to negotiate a first power contract with a first device connected to the first power delivery port, wherein the second source controller is configured notify the first source controller of a power requirement of a second device connected to the first power delivery port, wherein the first source controller is configured to renegotiate the first power contract with the first device to a lower power upon determining that a sum of the first power contract and the power requirement of the second device exceed a maximum power suppliable by the AC/DC converter.

In an example, the first power delivery port is a first USB port, wherein the second power delivery port is a second USB port.

According to another aspect, an electrical wiring device includes: a USB port accessible through a faceplate of the electrical wiring device, wherein the USB port is configured to provide a charging current to a device connected to the USB port; a current sensor configured to generate a current sense signal representative of an amount of the charging current drawn by the device connected to the USB port; and a controller operably connected to the current sensor to receive the current sense signal, the controller being configured to operate at least one LED to indicate that the device connected to the USB port has reached a predetermined charge when the current sense signal indicates that an amount of the charging current drawn by the device connected to the USB port is below a predetermined threshold.

In an example, the current sensor is a current sense resistor disposed in series with the USB port.

In an example, the predetermined threshold is 500 mA.

In an example, the electrical wiring device further includes a second USB port accessible through the faceplate of the electrical wiring device, wherein the second USB port is configured to provide a second charging current to a second device connected to the second USB port; and a second current sensor configured to generate a second current sense signal representative of an amount of the second charging current drawn by the second device connected to the second USB port, wherein the controller is operably connected to the second current sensor to receive the second current sense signal, the controller being configured to operate at least one second LED to indicate that the second device connected to the second USB port has reached a predetermined charge when the second current sense signal indicates that an amount of the second charging current drawn by the second device connected to the second USB port is below a second predetermined threshold.

In an example, the predetermined threshold is the same as the second predetermined threshold.

In an example, the controller comprises a first source controller and a second source controller, wherein the first source controller is configured to adjust a DC voltage output from a first DC/DC converter to the USB port, wherein the second source controller is configured to adjust a second DC voltage output from a second DC/DC converter to the second USB port.

According to another aspect, an electrical wiring device includes: a USB port accessible through a faceplate of the electrical wiring device; a controller configured to determine a power level to provide to the USB port; and a thermistor disposed in proximity to the USB port such that a resistance of the thermistor changes in response to a temperature change of the USB port, wherein the controller is configured to detect a value representative of the resistance of the thermistor and to change the power level provided to the USB port when the value representative of the resistance of the thermistor reaches a threshold.

In an example, the electrical wiring device further includes: a second USB port accessible through the faceplate of the electrical wiring device; a second controller configured to determine a power level to provide to the second USB port; and a second thermistor disposed in proximity to the second USB port such that a resistance of the second thermistor changes in response to a temperature change of the USB port, wherein the second controller is configured to detect a value representative of the resistance of the second thermistor and to change the power level provided to the second USB port when value representative of the resistance of the second thermistor reaches a second threshold.

In an example, the thermistor is a disposed in a voltage divider, wherein the voltage is an output voltage of the voltage divider.

In an example, the thermistor is disposed in series between a resistor of the voltage divider and ground.

In an example, the thermistor receives at a first terminal an applied voltage that is applied to the voltage divider and at a second terminal a resistor of the voltage divider.

In an example, the controller applies to the voltage divider the applied voltage.

In an example, the value representative of the resistance is a voltage.

In an example, the thermistor is an NTC.

In an example, the thermistor is a PTC.

In an example, changing the power level comprises ceasing to provide power to the USB port.

In an example, changing the power level comprises reducing power to the USB port.

In an example, changing the power level comprises renegotiating a power level with a mobile device connected to the USB port.

BRIEF DESCRIPTION OF THE SEVERAL VIEWS OF THE DRAWINGS

The present invention will be more fully understood and appreciated by reading the following Detailed Description in conjunction with the accompanying drawings, in which:

FIG. 3A-1 is a portion of a schematic of a power delivery circuit, according to an example.

FIG. 3A-2 is a portion of a schematic of a power delivery circuit, according to an example.

FIG. 3B-1 is a portion of a schematic of a power delivery circuit, according to an example.

FIG. 3B-2 is a portion of a schematic of a power delivery circuit, according to an example.

FIG. 4B-1 is a portion of a schematic of a power delivery circuit, according to an example.

FIG. 4B-2 is a portion of a schematic of a power delivery circuit, according to an example.

FIG. 4B-3 is a portion of a schematic of a power delivery circuit, according to an example.

FIG. 4B-4 is a portion of a schematic of a power delivery circuit, according to an example.

DETAILED DESCRIPTION OF THE INVENTION

Various examples described in this disclosure relate to supplying independent power levels to multiple power delivery ports disposed in an electrical wiring device, connected-device charge-status indication, and thermal management of one or more power delivery ports.

Figure 1:
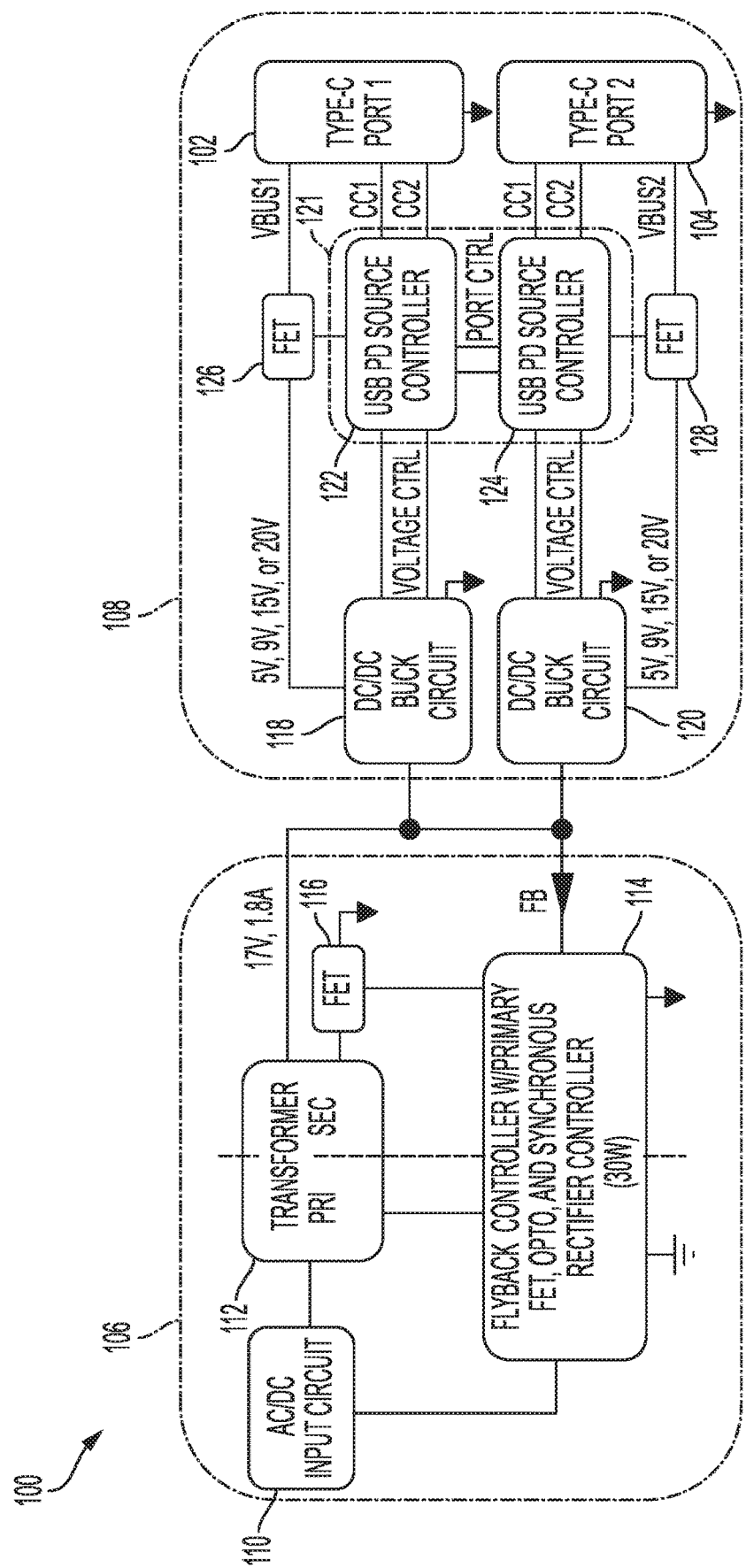
FIG. 1 is a block diagram of a power delivery circuit, according to an example.
Figure 5:
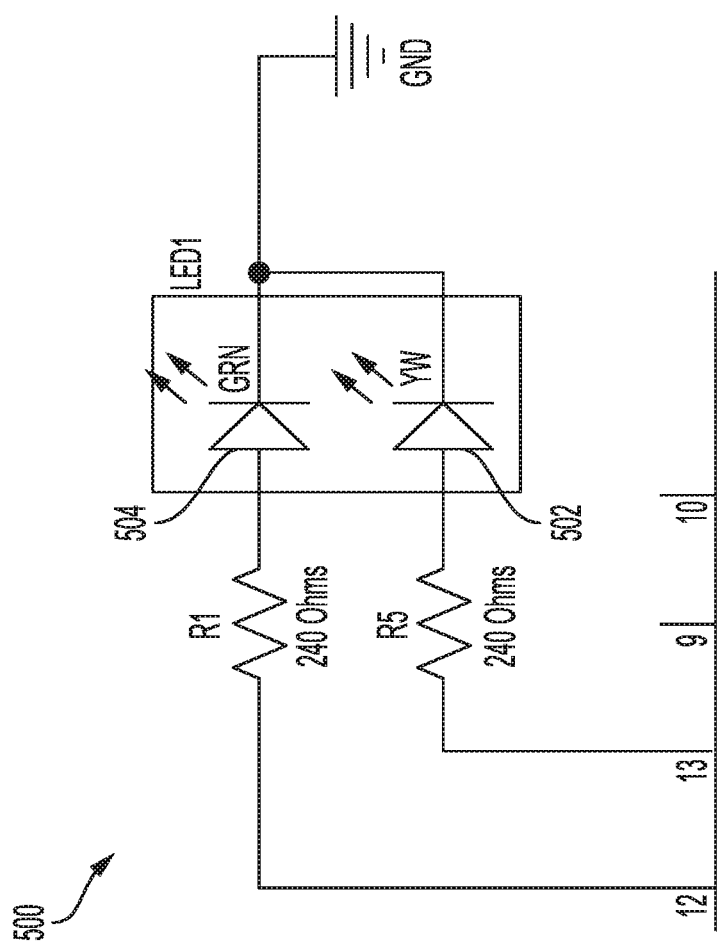
FIG. 5 is a schematic of an indicator, according to an example.

FIG. 1 depicts a wiring schematic of a power delivery circuit 100 disposed in an electrical wiring device such as an electrical outlet or switch (an example of such a wiring device is shown in FIG. 5 as wiring device 500). As shown, power delivery circuit 100 includes two independent power delivery ports 102, 104. Although two power-delivery ports 102, 104 are shown, in alternative examples, the concepts described in this disclosure can be extended to three, four, or any number of ports greater than two. In an example, the power-delivery ports can each be a Type-C USB port. Type-C USB ports offer multiple power profiles to a connected device: 5V/3A, 9V/3A, 15V/2A, or 20V/1.5A. When a new device is connected, a power contract is negotiated between the device (SINK) and the USB port (SOURCE) (e.g., USB ports 102, 104). Because two USB ports 102, 104 are included, two different devices can be connected simultaneously to power delivery circuit 100 (more devices can be connected in examples including more than two ports). In the alternative to Type-C USB ports, the power-delivery port can be any type of port for delivering power to a device, including potential future types of USB ports.

In the example shown, the power delivery circuit 100 is divided into an AC/DC power supply section 106 and a power delivery section 108. The AC/DC power supply section 106 receives an AC mains signal (e.g., from an upstream source such as an electrical panel) and converts it to a DC signal of, e.g., 17 v, 1.8 A (30 W) although other voltages, currents, and, consequently, total output power figures, are contemplated. The AC/DC power supply section 106 can include an AC/DC input circuit 110, which receives the input AC signal and outputs a DC signal. The AC/DC input circuit 110 can include, for example, a bridge rectifier and smoothing capacitor, although other examples of an AC/DC converter are contemplated. The AC/DC power supply section 106 can further include a flyback converter comprising, in an example, a transformer 112, having a primary and secondary side, a secondary FET 116 which is controllable by a flyback controller 114; more specifically, secondary FET 116 receives from flyback controller 114 a drive signal at secondary FET 116 gate. Secondary FET 116 operates to connect the secondary side of transformer 112 to ground according to the drive signal received from the flyback controller 114. The flyback controller 114, in turn, receives from the AC/DC input circuit 110 a under/over voltage sensing signal and a feedback signal from the power delivery section 108, and, consequently, controls the internal FET of controller 114 and secondary FET 116 in order to deliver a regulated voltage/current to the power delivery section 108. The AC/DC power supply section 106 is merely provided as an example of a power supply section that receives an AC signal and converts it to a regulated DC output. Accordingly, any other suitable AC/DC power supply can be used. In examples in which the received signal is a DC signal, suitable DC/DC power supplies can be used.

The power delivery section 108 includes two DC/DC converters 118, 120 each supplying a DC output to one of the power delivery ports 102, 104. The outputs of the DC/DC converters 118, 120 are respectively controlled by controller 121. In the example of FIG. 1, controller 121 can comprise one or more source controllers and any associated hardware, configured to control the individual DC/DC converters 118, 120, according to a negotiated power contract between a device connected to one of the power delivery ports and controller 121. In the example shown, source controller 121 comprises source controllers 122, 124, which are individual microcontrollers and any associated hardware, that respectively control one of DC/DC converters 118, 120. In an alternative example, source controllers 122, 124 can be implemented as a single microcontroller that is in communication with both power delivery ports 102, 104 and both DC/DC converters 118, 120, and manages all contract negotiation with the devices connected to power delivery ports 102, 104.

In the example of Type-C USB ports, the source controllers 122, 124 set the output of the power-delivery ports 102, 104 to one of the following outputs: 5V/3A, 9V/3A, 15V/2A, or according to the power contract negotiations with the connected device. Furthermore, the source controllers 122, 124 respectively enable or disable the outputs of the DC/DC converters 118, 120 by supplying a gate drive signal to FETs 126, 128. Thus, in the event that a device is connected to one of power delivery ports 102, 104, the respective source controller 122, 124 negotiates a power contract with the connected device, sets the respective DC/DC converter 118, 120 to supply the negotiated power, and enables the respective FET 126, 128 so that power begins flowing to the connected device. In an example, the DC/DC converters 118, 120 are buck circuits, although it should be understood that any suitable DC/DC converter can be used.

Because the AC/DC power supply section 106 can only deliver a finite amount power, both power delivery ports 102, 104 often cannot supply maximum requested power to both power delivery ports at once. For example, in the example of a 30 W AC/DC power supply section 106 and the Type-C USB ports 102, 104, the max supplied power for each port cannot exceed if the connected devices are to receive equal power. Accordingly, when one device connected to a port has negotiated a power contract of greater than 15 W, the power contract must be renegotiated if a second device is connected to the second power delivery port and requires maximum deliverable power. Stated differently, when one power delivery port 102, 104 is delivering a first power level which cannot be matched by the other power delivery port 102, 104 without exceeding the maximum deliverable power of the AC/DC power supply section 108, the power delivery section 108 sets the power levels of the power delivery ports 102, 104 to equal a value that represents a total output power that can be delivered by the AC/DC power supply section 106.

The act of resetting the power levels to a value compatible with the supply of the AC/DC power supply section 106, in the examples of USB Type-C power delivery ports 102, 104, requires the renegotiation of the power contract with the previously connected device. The renegotiation of the power contract can be triggered according to a signal from the source controller 122, 124 in communication with the more-recently connected device. For example, if a device connected to power delivery port 102 has negotiated a power contract of, e.g., 15V/2A, thus receiving the maximum power allowed by the AC/DC power supply section 106, source controller 122 can renegotiate the power contract to a lower power setting, 5V/3A, 9V/1.5A, or 15V/1A upon receiving a notification from source controller 124 that a device has been connected to power-delivery port 104. Likewise, source controller 124, operating according to a signal received from source controller 122 indicating that power delivery port 102 is currently connected to a device, will not negotiate a power contract above 15 W. In this way, both source controllers negotiate a power contract not greater than 15 W when two devices are simultaneously connected to power delivery section 108. The above example is provided for a 30 W power supply. In other examples, the power supply can supply other powers besides 30 W. In these examples, the power supplied by each power delivery port 102 will be commensurate with the maximum power that can be supplied by the power supply. Thus, if the power supply can supply 50 W of power, each power delivery port could supply a maximum of 25 W.

In an example, both source controllers 122, 124 can store the current state of the source controllers 122, 124 and send update signals to other source controller 122, 124 when the connect/disconnect status changes. In this way, the source controllers 122, 124 can manage the power output so that it does not exceed the power rating of the AC/DC power supply section 106. In an alternative example, source controllers 122, 124 can be implemented as a single source controller that is in communication with both power delivery ports 102, 104 and both DC/DC converters 118, 120. In this case, the single source controller can monitor and store the status of each power delivery port 102, 104 and set the output of each DC/DC converter 118, 120, accordingly, such that the power rating of the AC/DC power supply section 106 is not exceeded.

In an alternative example, rather than relying on status messages received from the other source controller 122, 124, each source controller 122, 124 can monitor the power output of the respective DC/DC controller (e.g., by monitoring the voltage and/or current output) of the DC/DC converter 118, 120 and automatically renegotiate the power contract upon determining that the voltage, current, or power have fallen below the predetermined threshold indicative of the respective DC/DC converter exceeding the power rating of the AC/DC power supply section 106.

While, in the above example, the connected devices will typically receive equal power (e.g., 15 W each) it is conceivable that the power requirement of one device could be prioritized over the other, e.g., by a user selection, or if one device has a higher range of acceptable powers. For example, if the first device can receive a power level from 10-30 W, but the other, second, connected device is configured to receive a minimum of 20 W of power, the power requirements of the second connected device can be prioritized over the first device, and thus the power can be renegotiated to the first device to 10 W and 20 W can be supplied to the second connected device. In an example, the status message from each source controller 118, 120 could specify a range of acceptable power requirements of each device, and, a supplied power can be negotiated between the source controllers 122, 124 to deliver the optimal charge current to each connected device for the power contract is renegotiated with the first-connected device.

Figure 2:
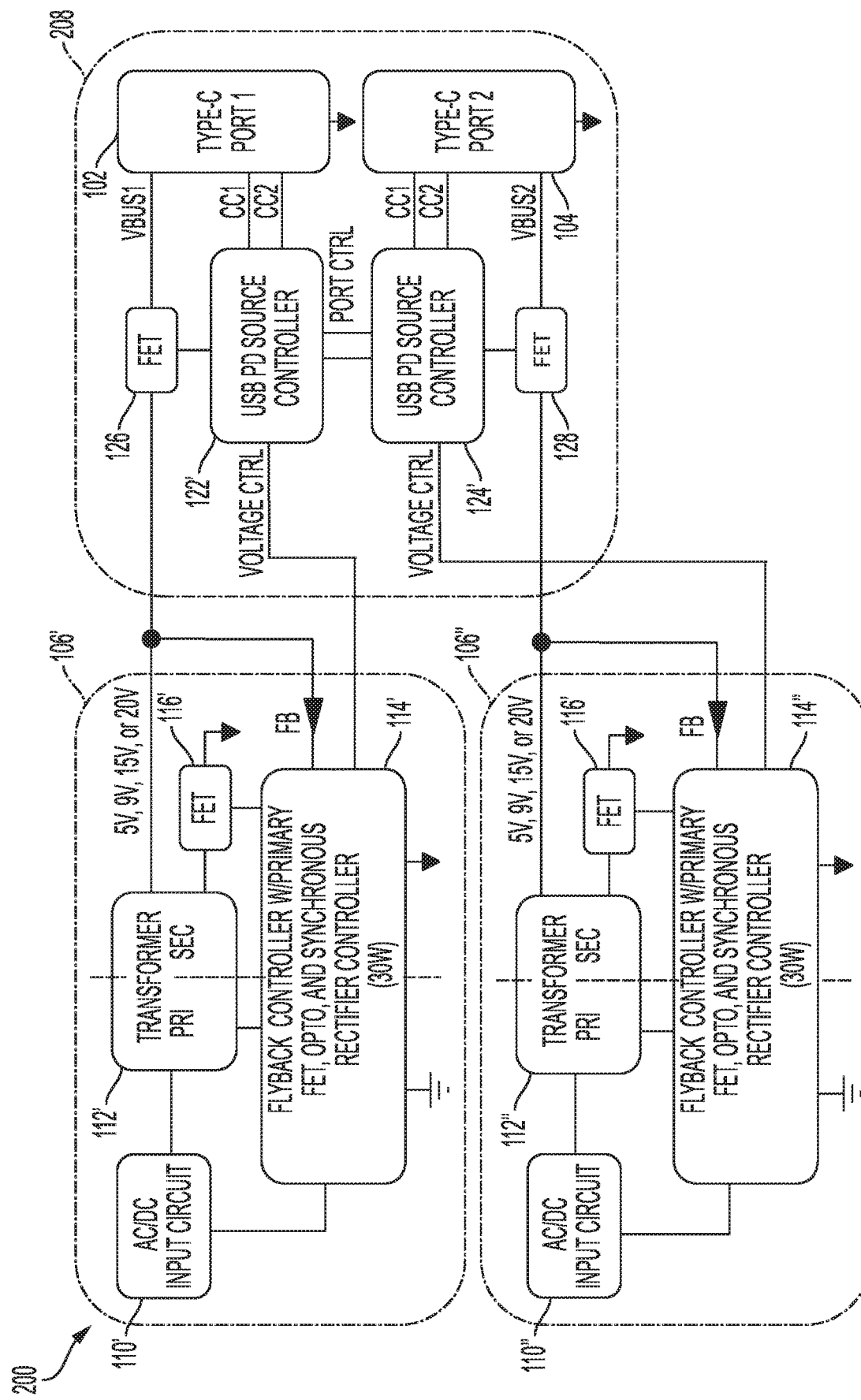
FIG. 2 is a block diagram of a power delivery circuit, according to an example.

An alternative example of a power delivery circuit is provided in FIG. 2. In this example, rather than providing a DC/DC converter at the output of an AC/DC power supply section, two or more AC/DC power supply sections are used. Thus, as shown in FIG. 2, AC/DC power supply 106' and AC/DC power supply section 106" are both connected to an AC source. Each power deliver port 102, 104, in this example, receives power from a respective AC/DC power supply 106', 106". A discussion of the operation of each AC/DC power supply section will be omitted as each functions in a manner substantially similar to the operation of AC/DC power supply section 106, described above.

Power delivery section 208 operates in a manner similar to power delivery section 108; however, source controllers, rather than controlling DC/DC converters, control at least one AC/DC power supply. Thus, in the example of FIG. 2, source controller 122' sets the output power value of AC/DC power supply 106' and source controller 124' sets the power value of AC/DC power supply 106". Like the example of power delivery section 108, the source controllers 122', 124' also function to enable FETs 126, 128.

In the Type-C USB example, a device is connected to one of the type-C power supply ports 102, 104, the associated USB PD controller 122', 124' offers the following power profiles: 5V/3A, 9V/3A, 15V/2A, or 20V/1.5A. The associated USB PD 122', 124' controller configures the respective output of the AC/DC power supply 106', 106" to provide the voltage selected by the device during the power contract negotiations. The USB PD 122', 124' controller then energizes the VBUS FET to provide charging power to the device.

Like the example of the power supply 108, if a second device is connected while the first device is charging, the USB PD controller will communicate this to the USB PD controller on the active port. At that time, the power contract will be re-negotiated as both ports must now share the total power of 30 W (15 W max per port). In an example, the USB PD controllers offer the following power profiles: 5V/3A, 9V/1.5A, or 15V/1A. The USB PD controllers configure the output of each AC/DC power supply to provide the voltage selected by the device during the power contract negotiations. The USB PD controllers then energize the VBUS FETs to provide charging power to the devices. For example, if USB source controller 122' is connected to a device at port 102, when a second device is connected to port 104, USB source controller 124" will communicate with USB source controller 122', causing USB source controller 122' to renegotiate the power contract with the first connected device, in accordance with power available to each when two devices are connected. The AC/DC power supplies 106', 106" are then set to deliver the respective powers negotiated with the connected devices.

The negotiated powers, and the method of selecting the deliverable power, including, in some examples, the method of communication between the source controllers, is discussed in more detail in connection with FIG. 1 and power supply section 108 and likewise apply to the example described in connection with FIG. 2.

Figures 1, 3A:
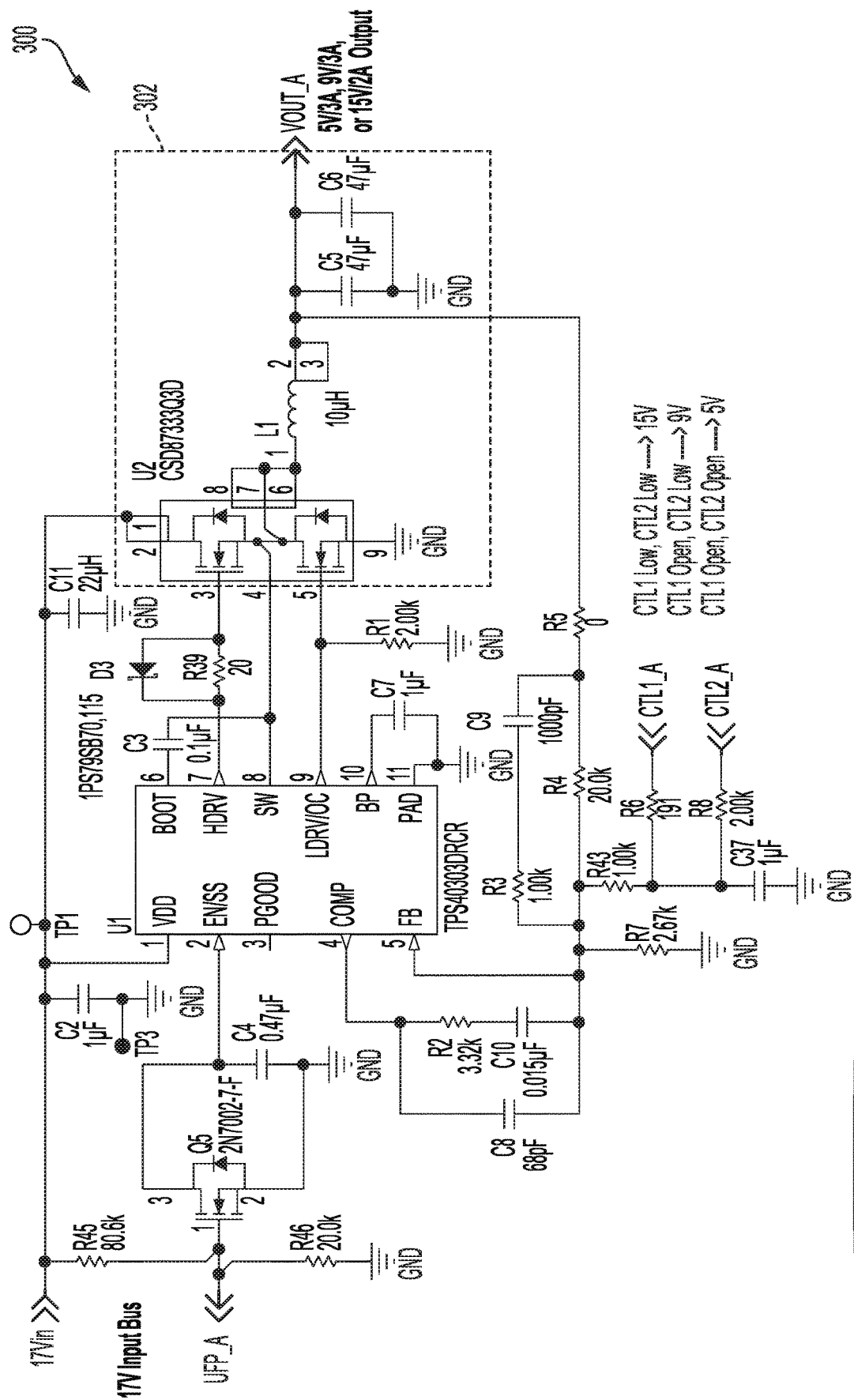
Figures 2, 3A:
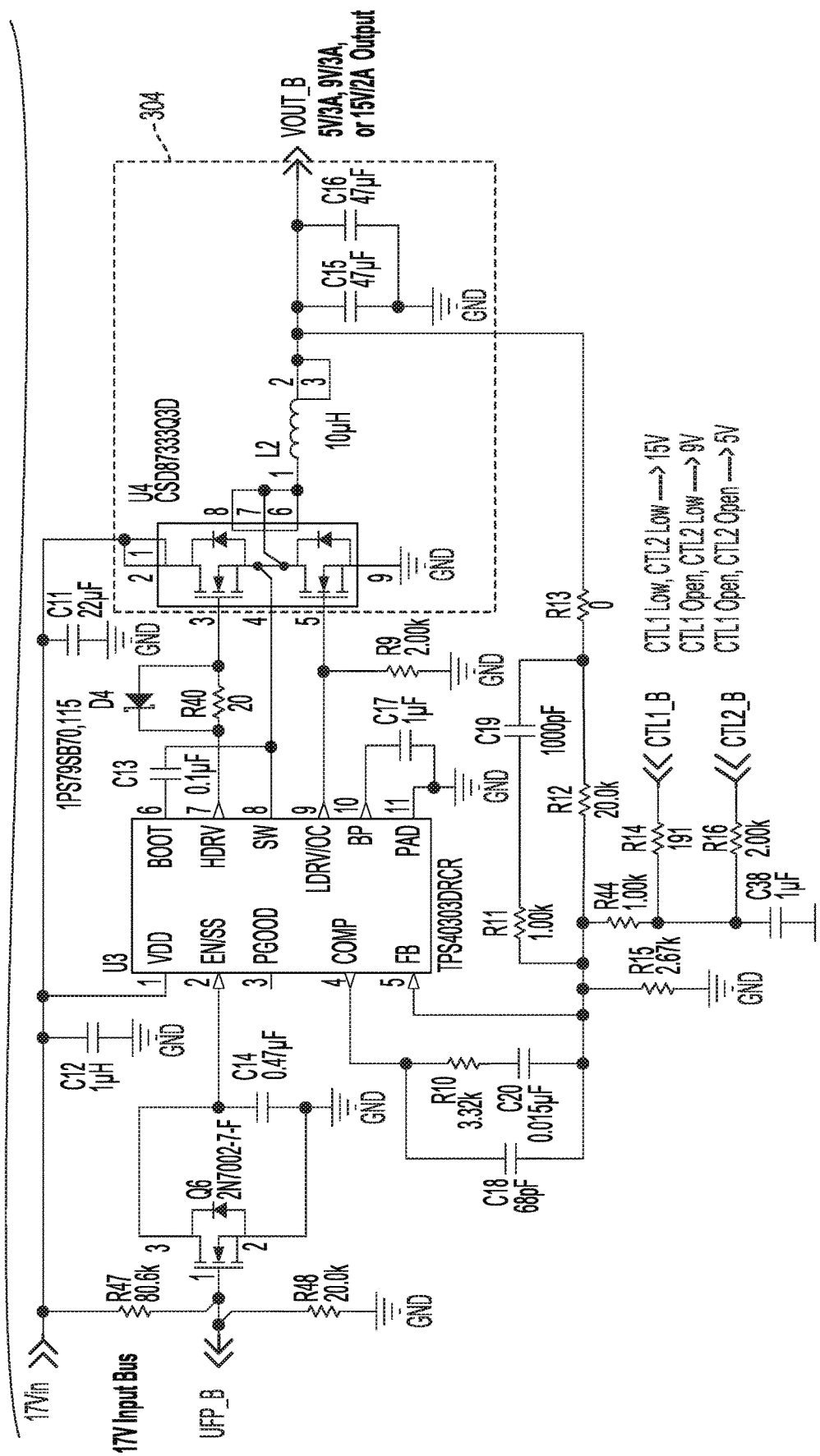
Figures 1, 3B:
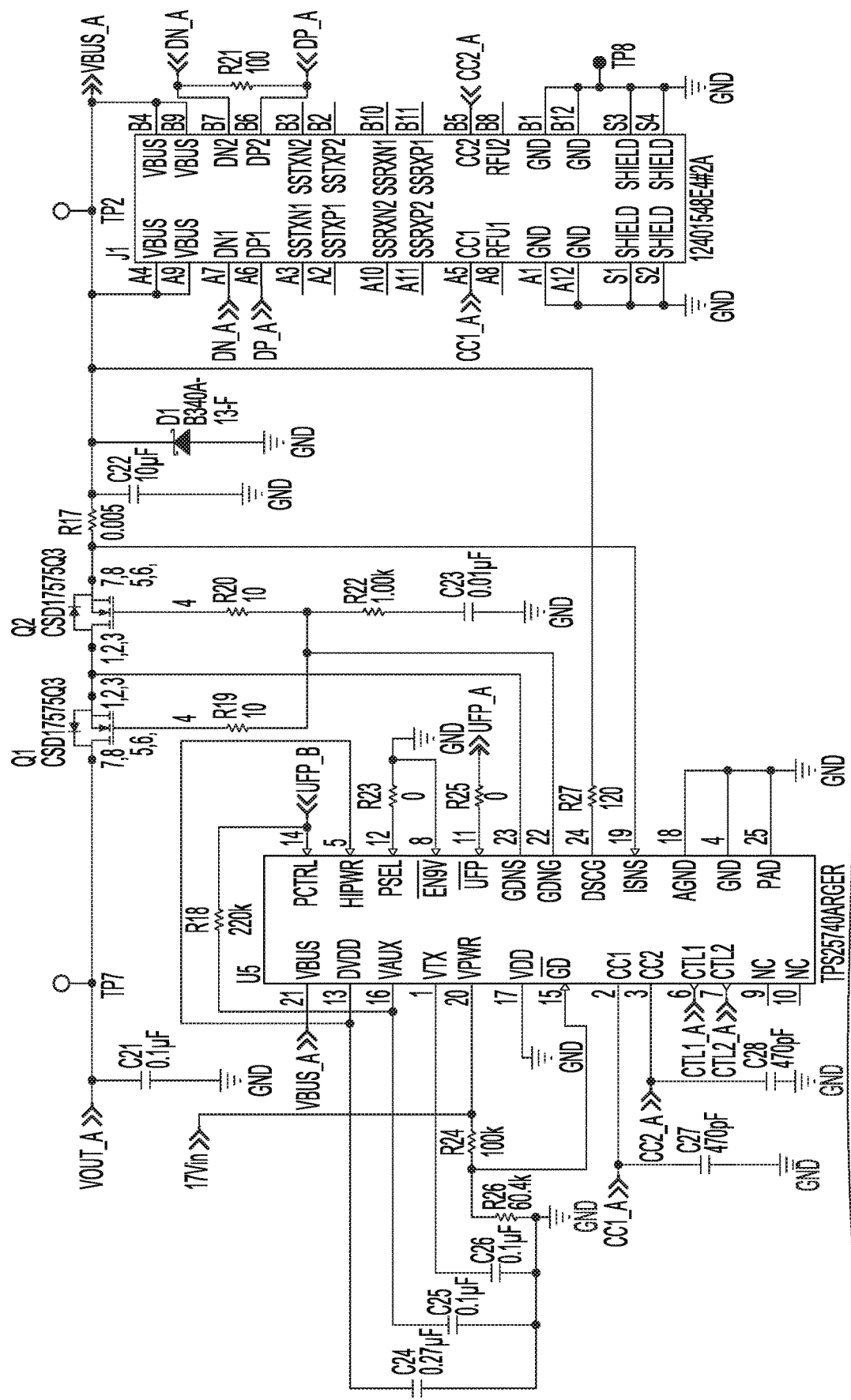

FIGS. 3A and 3B depict an example of a detailed circuit implementation of the architecture shown, at a high level, in FIG. 1. More particularly, FIGS. 3A-1 and 3A-2 together depict a USB power delivery circuit 300, which includes Buck circuits 302, 304, that perform DC/DC conversion on a 17 V input. (The 17 V input is supplied by an AC/DC converter, such as the AC/DC power supply section described in connection with FIG. 4A, that converts the AC mains signal to the 17 V DC signal, although any suitable AC/DC converter can be used.) Buck circuit 302 comprises half-bridge power block U2, inductor L1, and capacitors C5 and C6. Buck circuit 302, and, specifically half-bridge power block U2, is operated by controller U1. Similarly, Buck circuit 304 comprises half-bridge power block U4, inductor L2, and capacitors C15 and C16, and is controlled by controller U3. (It should be understood that this example of a Buck circuit is simply one potential Buck circuit topology.) As shown, Buck circuits 302, 304 respectively supply voltages VOUT_A and VOUT_B, which form the VBUS voltages VBUS_A and VBUS_B to Type-C USB ports J1, J2, shown in FIG. 3B.

FIGS. 3B-1 and 3B-2 together depict source controllers U5, U6, which respectively negotiate the power contracts with connected devices to USB ports J1, J2. For example, source controller U5 negotiates the power contract with the device connected to Type-C USB port J1. In response, source controller U5 adjusts feedback signals CTL1_A and CTL2_A, which are input to FB pin 5. The values of feedback signals CTL1_A and CTL2_A are selected so that Buck controller U1 sets the output VOUT_A according to the power contract negotiated with the device connected to Type-C USB port J1. Generally, the Buck controller U1 expects a feedback voltage of 600 mV on the FB pin 5. By sinking current to CTL1_A and CLT2_A, this feedback voltage can be lowered, causing Buck controller U1 to drive VOUT_A higher. The feedback voltage to Buck controller U1 is kept below 600 mV until VBUS_A, as measured by source controller U5, reaches the voltage negotiated in the power contract to the device connected to USB port J1.

Similarly, source controller U6 negotiates the power contract with the device connected to Type-C USB port J2. Source controller U6 adjusts feedback signals CL1_B and CTL2_B such that Buck controller U3 sets the output VOUT_B according to the power contract negotiated with the device connected to the Type-C USB port J2. In this manner, different power contracts can be negotiated with the devices connected to Type-C USB ports J1, J2. As described above in connection with FIGS. 1 and 2, source controllers U5, U6 can communicate in order to coordinate the negotiation or renegotiation of power contracts with devices connected to Type-C USB ports J1, J2.

Figure 4A:
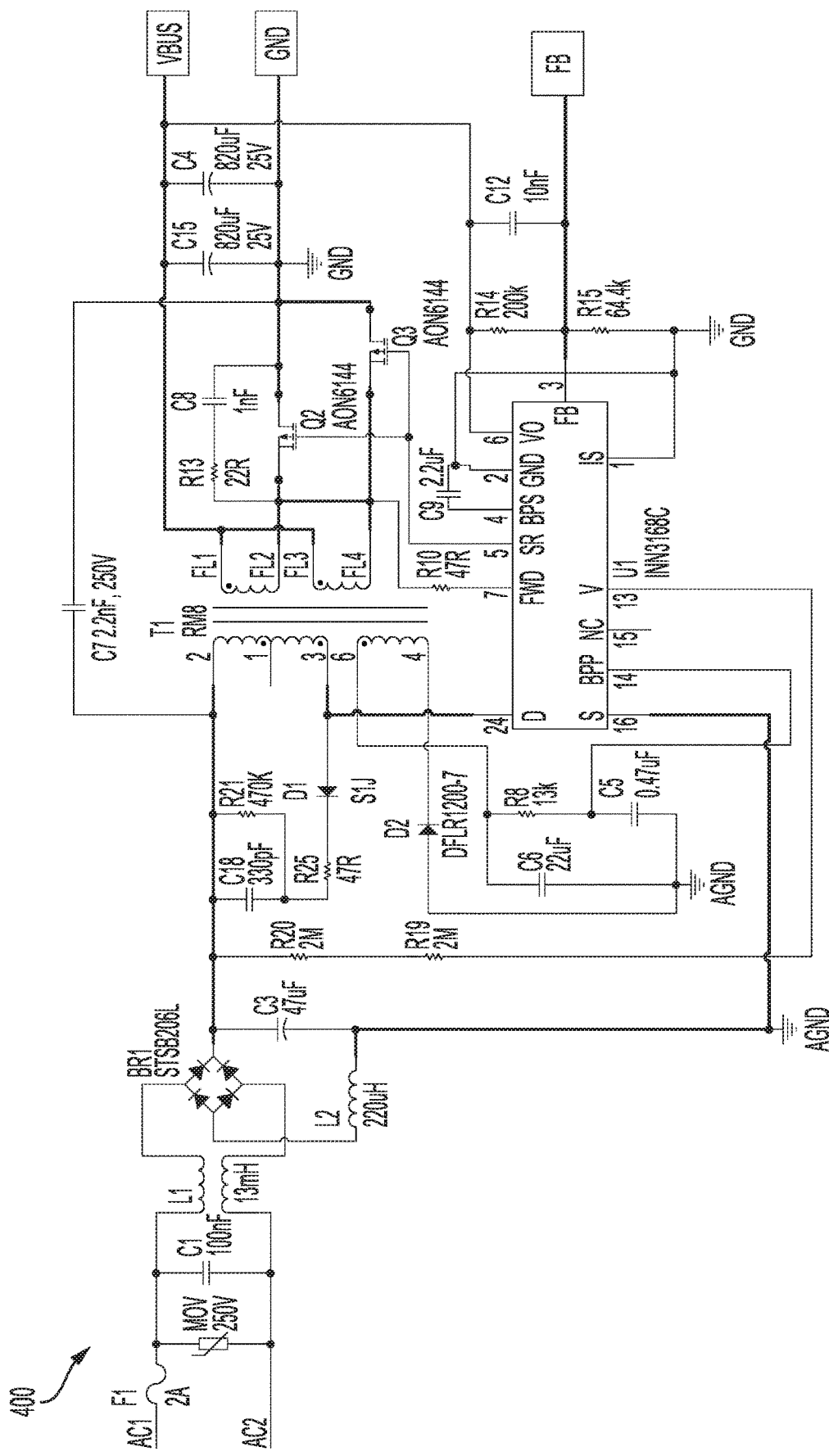
FIG. 4A is a portion of a schematic of a power delivery circuit, according to an example.
Figures 1, 4B:
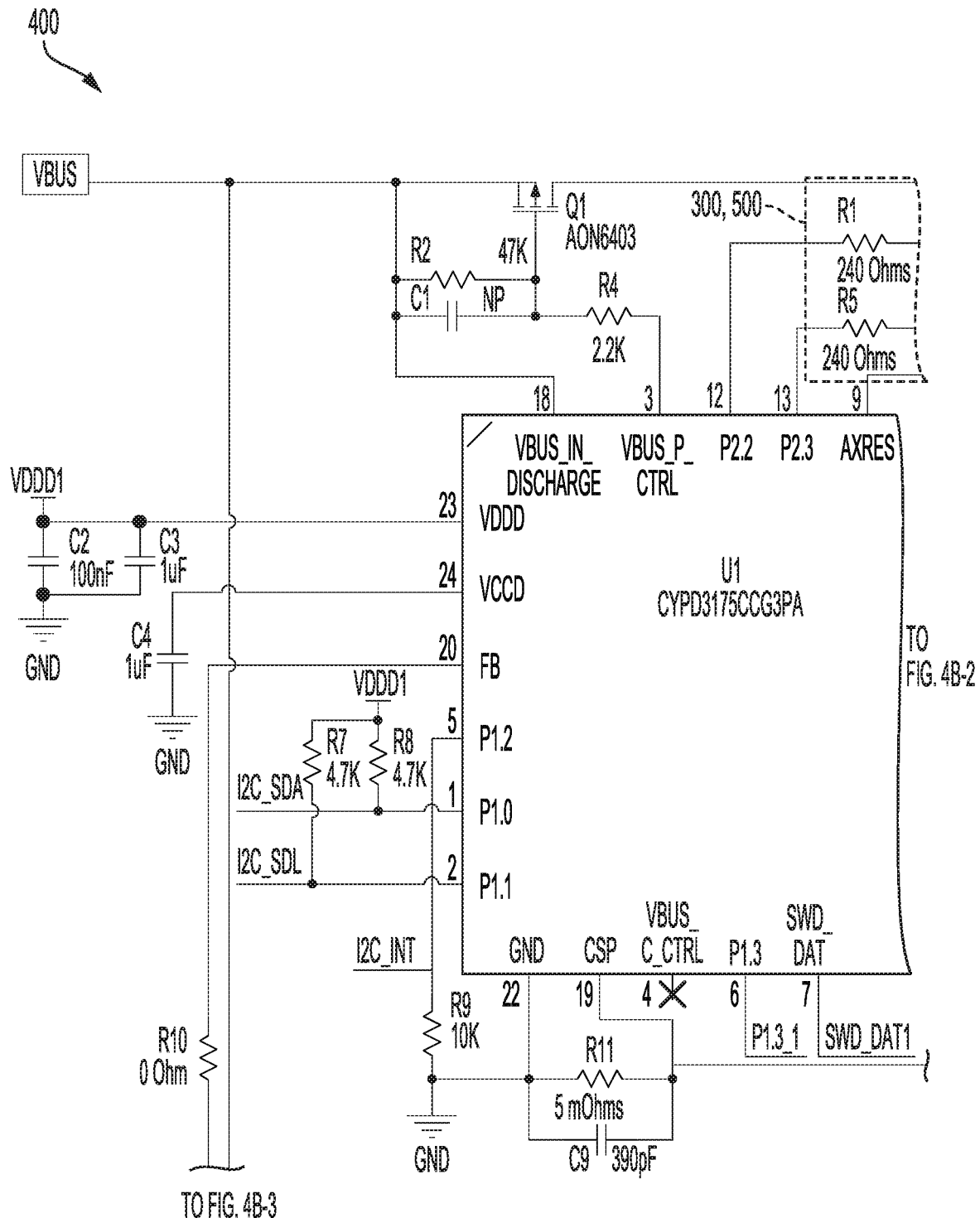
Figures 2, 4B:
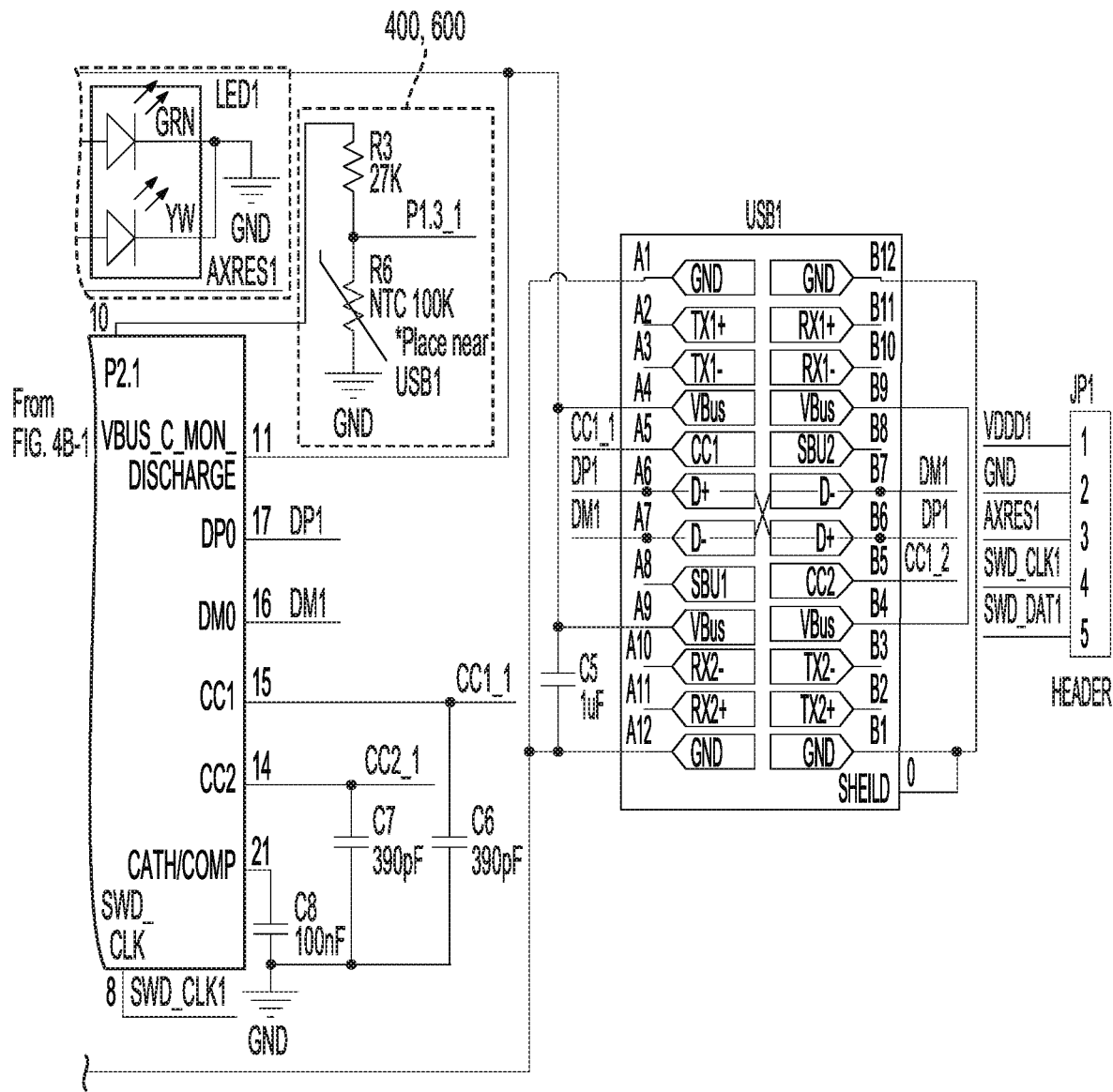

Turning now to FIGS. 4A and 4B, there is shown an alternative power delivery circuit 400. Looking first at FIG. 4A, there is shown an example implementation of an AC/DC power supply section. An AC mains input signal is received at terminals AC1, AC2, and then is rectified and filtered via bridge rectifier BR1, capacitors C3, and inductor L2. The rectified and filtered signal is input to transformer T1. Controller U1, which, in an example, is a Power Integrations INN3168C power supply controller, operates in secondary side sensing and regulating the feedback signal appearing at pin 3 through the voltage divider of R14 and R15. U1 contains an integral switching device (e.g., a MOSFET). (Controller U1 further includes primary side switching through an internal FET positioned between pins 16 and 24.) While controller U1 keeps MOSFET ON, current in the primary winding of transformer T1 increases. During this time, current is prevented from flowing through the secondary winding of transformer T1 by MOSFETs Q2 and Q3, which is controlled by controller U1. (MOSFETs Q2 and Q3 serve as the secondary side rectifier. Generally, the MOSFET are preferred to the traditional diode due to its much lower on-state voltage, which results in less power loss and an increase in overall efficiency.) Once the controller turns the integral MOSFET OFF, it, at the same time, turns MOSFETs Q2 and Q3 ON. The energy stored in the primary winding from the MOSFET ON-time is transferred to the secondary winding of T1, which charges output filter capacitor C15. (Capacitor C4 provides additional high-frequency attenuation.) Once controller U1 again turns the integral MOSFET OFF, the load current is supplied from the output filter capacitor C15. The integral MOSFET, transformer T1, and MOSFETs Q2 and Q3 together form a variant of a flyback converter (although other variants can be used). The snubber circuit, consisting of diode D1, resistor R21, capacitor C18, and resistor R25 effectively clamps the voltage and suppresses ringing on the drain of the MOSFET.

As shown in FIGS. 4B-1-B-4 two Cypress CCG3PA PD source controllers U1, U2 are employed to manage Type-C USB ports USB1, USB2. Source controllers U1, U2 respectively negotiate power contracts with devices connected to USB1, USB2. Depending on the power required by the negotiated power contracts, sources controllers U1, U2 will sink current to the voltage divider formed by R14, R15. Controller U1 is programmed to expect a 1.2 V input at FB pin 3. During normal operation of AC/DC power supply circuit of FIG. 4A, when a VBUS of 5 V is required by USB ports USB1 and USB2, 1.2 V will be present at FB pin 3. By sinking current 3 to the voltage divider formed by R14, R15, source controllers U1, U2 can set the voltage at FB pin 3 to a voltage lower than 1.2 V. Thus, if a power contract is negotiated with a device connected to one of USB ports USB1, USB2 that requires a voltage greater than 5 V, one of source controllers U1, U2 sink current to the voltage divider R14, R15, lowering the voltage at FB pin 3. Because controller U1 now detects a FB voltage that is too low, controller U1 will drive the internal MOSFET and MOSFETs Q1, Q2 to raise the output voltage VBUS. One of source controllers U1, U2 will continue to sink current in this manner until the VBUS reaches the output required negotiated output voltage.

In addition, Cypress CCG3PA PD source controllers U1, U2 each include thermal sensors and current sensors that permit the controllers U1, U2 to monitor the temperature of each respective USB port and the charge level of a device connected to the respective USB port, as will be described in more detail below.

An example of the current sense functions of source controllers U1, U2 shown in FIGS. 4B-1-4B-4 will now be described. As shown in FIGS. 4B-1-4B-4, each source controller, such as, for example, the Cypress CCG3PA PD source controller U1, includes a pin (e.g., CSP pin 19) for measuring current to within 100 mA. The current sense pin can be employed to measure the current flowing to the device, in order to determine the charge status of the device. The current can be measured as a voltage across a current sense resistor (e.g., R11) positioned in series with the charging device. Stated differently, the current sense resistor R11 is positioned to receive the charge current flowing through the device connected to USB1 port. The voltage across the current sense resistor R11, being proportional to the current through the charging device, can be input to the current sense pin 19 of the controller U1 to measure the current.

Generally, as the battery of a given attached device approaches a full charge, the current drawn begins to diminish. Recognizing this, source controller U1 can be programmed to detect when the measured current drops below a threshold, indicating that the charging device is above a desired charge level. For example, source controller U1 can be configured to detect when the charge current delivered by the power delivery port (e.g., power delivery port 102, 104) falls below a threshold of 500 mA, indicating that the charging device is above approximately 95% of charge. Different thresholds can be selected to indicate different charge statuses. In an alternative example, rather than employing a controller to detect the charge current, a circuit can be used to detect when the voltage across the current sense resistor falls below a threshold.

The following chart shows the percentage charge measured for a current threshold of 500 mA (the 500 mA threshold is only provided as one example of threshold that be used.) As shown, the threshold of 500 mA represents a threshold in which most tested devices are nearly at full charge:

| Device | Charge Percentage at 500 mA charge current drawn (+time at 100%) for Device On | Charge Percentage at 500 mA charge current drawn (+time at 100%) for Device Off |
| --- | --- | --- |
| iPhone X | 92% | 95% |
| iPhone 11 | 94% | 97% |
| Samsung S9+ | 97% | 100% |
| Samsung S10E | 94% | 96% |
| Google Pixel 3 | 88% | 94% |
| iPad Pro 3rd Gen | 92% | 92% |
| Samsung Tab S5E | 99% | 100% (+2 min) |
| Mac Air 2019 | 100% (+10 min) | 100% (+12 min) |

The wiring device can employ one or more indicator to notify a user of the charge status of the device. One such indicator 500 is shown in FIG. 5 (expanded from FIGS. 4B-1 and FB-2) comprising differently colored LEDs 502, 504. When a device is first connected and the charge current is detected to be above the threshold, LED 502, shown in FIG. 5 to be a yellow LED, can be illuminated by outputting a current from pin 13 of the controller (to indicate start of charging process). However, when the charge current is detected to be below the threshold, LED 504, shown in FIG. 5 to be a green LED, can be illuminated by outputting a current from pin 12 of the controller (to indicate device is sufficiently charged). Both the LEDs 502, 504 are in series with a current limiting resistor R1, R5 in order to maintain the current through the LED at acceptable levels.

Figures 3, 4B:
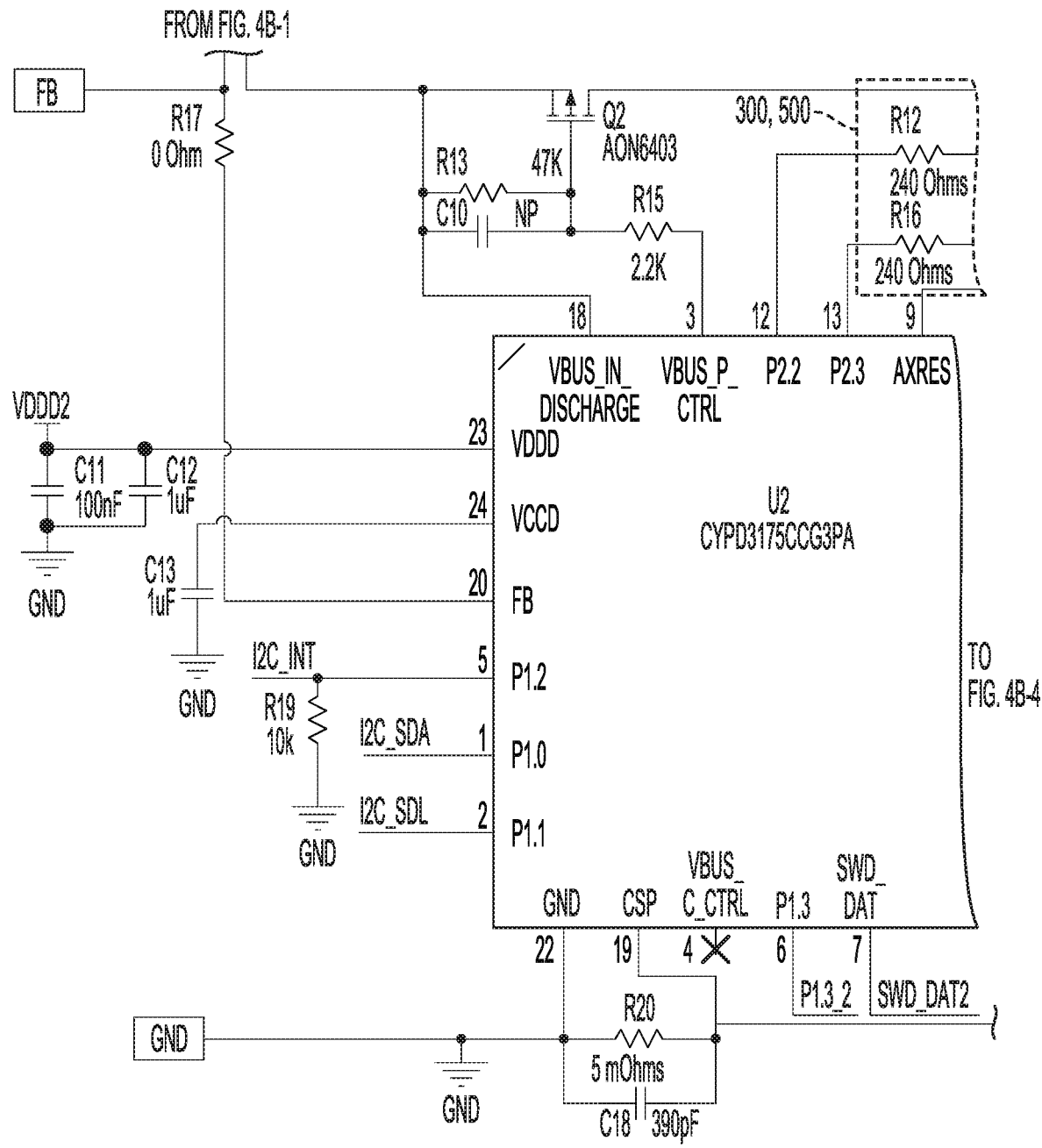
Figures 4, 4B:
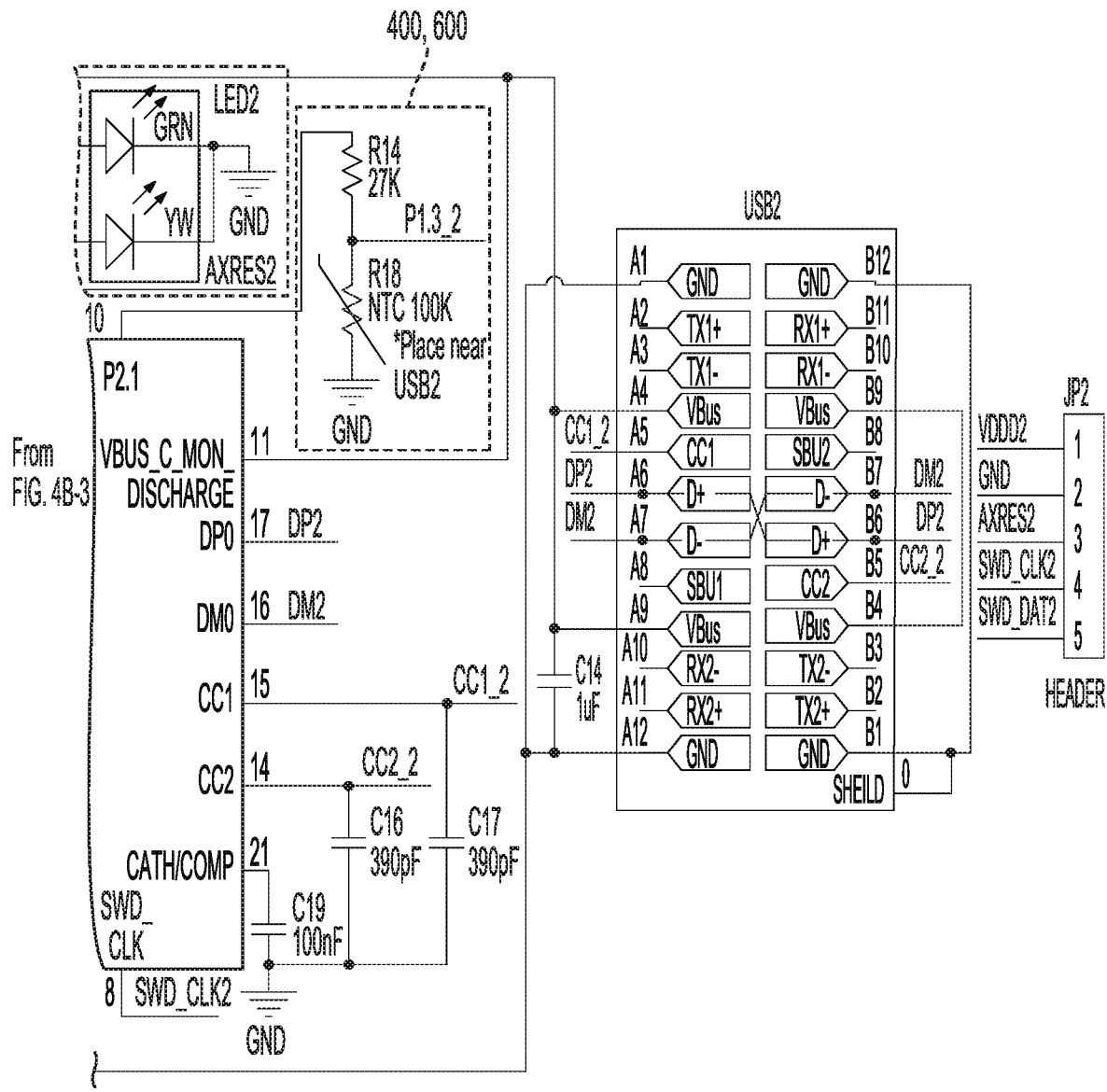

Furthermore, as shown in FIG. 4B-3, source controller U2 also includes a current sense resistor R20, the voltage across which is measured at the CSP pin 19 of source controller U2. Similar to source controller U1, source controller U2 measures the current supplied to USB port USB2 and notifies the user by appropriately illuminating the yellow LED of LED2 when the measured charge current is above a threshold value (e.g., 500 mA) and illuminating the green LED of LED2 when the measured charge current is below the threshold value. Thus, the face of the electrical wiring device 100 will feature, in this example, four LEDs, two LEDs (one green, one yellow) respectively associated with each USB charging port. In this way, a charge indication is independently provided for each USB port, and a user charging one or more devices will be able to infer the charge of each connected device at a glance.

In alternative examples, the LEDs can be selected to be any color suitable for notifying a user of the charge level (e.g., red, blue, orange). Furthermore, more than one threshold can be detected to indicate multiple charging levels. For example, a first threshold can be set to represent when the charge is above or below 80% charge, with a first LED being illuminated when below the 80% and a second illuminated when above the 80%. A second threshold can be set to represent when the charge is above or below 95% charge, with a third LED being illuminated when above the 95% charge level. Also, different colored LEDs are not the only manner in which a user can be notified of the charge level. For example, alternatively, a single LED can be made to blink to represent different charging levels. For example, while the device is below a threshold, the LED can blink to represent that device is charging but can be illuminated continuously when above the threshold. Different charge levels can be associated with different rates of blinking to notify a user of the charge of the device.

Figure 6:
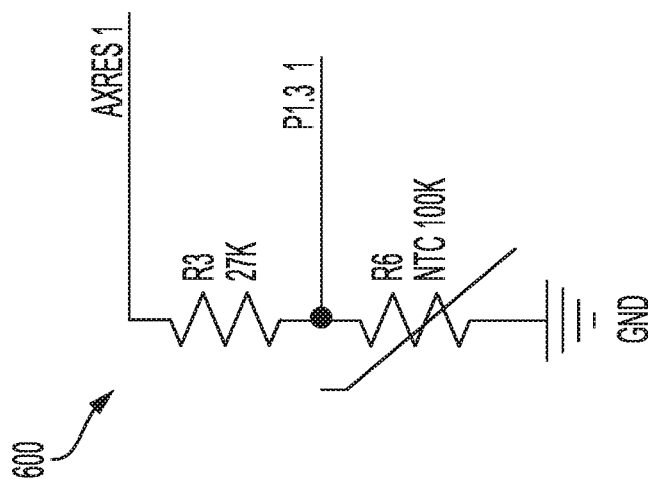
FIG. 6 is a schematic of a thermal sensor, according to an example.

The electrical wiring device can further include a temperature protection feature. FIG. 6 shows a schematic of a thermal sensor 600, which is expanded from FIG. 4B-2, comprising a voltage divider including a thermistor R6 and resistor R3. The output of the voltage divider comprised by resistor R3 and thermistor R6, denoted P1.31 in FIG. 6, forms a reference voltage that is inversely proportional to the ambient temperature of the area in which the thermistor is disposed. The reference voltage can be described as follows:

$$V_{P1.3\_1} = V_{AXRES\_1} \frac{R_6}{R_3 + R_6}$$

The resistance of R6, denoting the thermistor, will decrease as the temperature rises. Thus, when the thermal sensor 600 (or more particularly, the thermistor R6) is disposed near USB port USB1, the output reference voltage ($V_{P1.3\_1}$ in the equation above) will decrease as the temperature increases of the USB port increases. The output can be connected to, e.g., an input pin of a controller, which will read the reference voltage, and as described below, take some corrective action to reduce the heat of the USB port if necessary.

The voltage applied to the voltage divider comprised by resistor R3 and thermistor R6, denoted as $V_{AXRES\_1}$ in FIG. 6, is output from U1. The output is simply a known voltage, such that the reference voltage output from the voltage divider can be compared against a threshold. In other words, because the output of a voltage divider is a function of both the values of the constituent resistors (or thermistors) and the applied voltage, to compare the output to a threshold, the voltage applied to the voltage divider should typically be a known value. Thus, in various alternative examples, a different known voltage, such as the output of the AC/DC power supply section 106 or a VBUS output, such as VBUS1 or VBUS2, can be conditioned to provide input voltage to the voltage divider. Of course, depending on the context, various input voltages, such as VBUS1 or VBUS2, can vary (e.g., with the power contract negotiated with the connected device). Accordingly, if a voltage used to provide power to the voltage divider changes with context, controller U1 can take this into account and adjust the threshold voltage accordingly.

In an alternative example, rather than applying a known voltage, or assuming that the applied voltage is known, a change in output of the voltage divider can be measured and compared to a threshold. This effectively assumes a baseline output voltage, determined during runtime, that represents the proper functioning of the wiring device. This can be reconceived as a threshold determined as a ratio of the baseline output voltage. While this example can be used in the instance that the applied voltage is not known, it is likely less accurate, as it assumes that a baseline voltage is represents the proper functioning of the USB port, which is not guaranteed.

When the reference voltage descends below a threshold, the controller U1 can take some protective action, such as ceasing to supply power to a power supply port or to reduce the supplied power such as by renegotiating to a lower power profile. As the thermistor R1 is positioned to detect and respond to a heat from USB port USB1, controller U1 responds reduce the power supplied to USB1.

As shown in FIG. 4B-4, a second voltage divider, formed by resistor R14 and thermistor R18, is provided with controller U2. Thermistor R18 is placed near the second USB port USB2. It will be understood that the operation of the second voltage divider and the response of controller U2 follows that of the first voltage divider (i.e., resistor R3 and thermistor R6) and controller U1 to cease powering or to limit the power supplied to the second USB port USB2 in response to a comparison of the output of the second voltage divider, the reference voltage P1.3_2, to a threshold.

Accordingly, independent thermal control is provided to USB1 port and USB2 port, with power to each being independently limited according to the measured temperature at the respective USB port. In other words, the USB ports are independently thermally managed because the power of USB1 port is limited according to the measured temperature at USB1 by thermistor R6, and because the power of USB2 port is limited according to the measured temperature at USB2.

As described above, since the AC/DC power supply section 106 provides a finite amount of power to the DC/DC converters 118, 120, reducing the power supplied to one USB port (e.g., USB port USB1) can free up power to the remaining USB port(s) (e.g., USB port USB2). However, where power is reduced according to heat considerations, it can be potentially deleterious to increase the power to a USB port in the same wiring device for the simple reason that power is available. Accordingly, to reduce the overall heat of wiring device 100, the power provided to the remaining USB ports can remain the same while the power to overheating USB port is reduced, or, alternatively, the power of at least one of the remaining USB ports can also be decreased in order to effect a heat reduction of the wiring device as a whole.

In an alternative example, a PTC thermistor, rather than an NTC thermistor, can be used. Where the NTC thermistor resistance decreases with temperature, the PTC thermistor resistance increases with temperature. Thus, simply replacing the NTC thermistor in the voltage dividers of FIG. 4B with a PTC thermistor, as arranged in FIG. 4, results in the output of the voltage divider increasing as the temperature rises, instead of decreasing.

In an alternative example, the order of the thermistor R6 and resistor R3 can be reversed, resulting in the following equation to determine the temperature at the thermistor:

$$V_{P1.3\_1} = V_{AXRES\_1} \frac{R_3}{R_3 + R_6}$$

Where the thermistor is an NTC, the value the denominator decreases as temperature increases, resulting in the output value of the voltage divider increasing. Where the thermistor is a PTC thermistor, the value of the denominator decreasing as the temperature increases, resulting in the value of the voltage divider decreasing. However, because the denominator is the sum of the values of R3 and R6, rearranging the voltage divider in this manner will generally result in less sensitivity to temperature changes.

Figure 7:
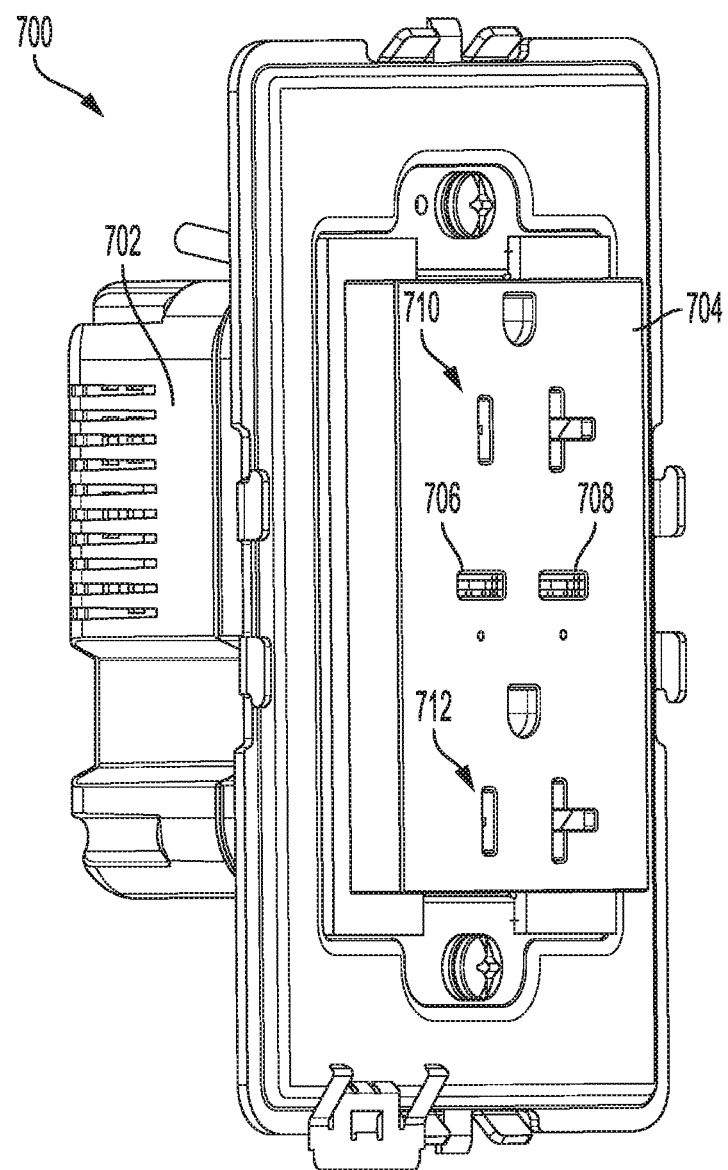
FIG. 7 is an isometric view of an electrical wiring device housing a power delivery circuit and including two power delivery ports, according to an example.

FIG. 7 depicts an isometric view of an example of an electrical wiring device 700 housing a power delivery circuit such power delivery circuit 100, 200. As shown, electrical wiring device 700 features a housing 702 and a faceplate 704. As mentioned, power delivery circuit 100, 200 can be enclosed within housing 702 and 704. Type-C USB ports 706, 708 are accessible through faceplate 704, and, in an example, at least partially extend through faceplate 704. As mentioned above, while Type-C USB ports 706 are depicted, this is simply one example of a type of power delivery port that can be included within electrical wiring device 700 and be accessible through faceplate 702. Indeed, in certain examples, different types of power delivery ports can be included in wiring device 700 and be accessible through faceplate 704.

Electrical wiring device 700 can further include receptacles 710, 712, which are configured to supply an AC mains signal to a load connected via a plug. In an example, electrical wiring device 700 can be a ground fault interrupt wiring device, configured to disconnect the AC mains signal from the receptacles 710, 712, using an interrupt mechanism, upon determining the presence of a fault. In alternative examples, the receptacles 710, 712 can be omitted.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring device for delivering power to multiple mobile devices, comprising:
a housing having a faceplate;
a first power delivery port accessible through the faceplate;
a second power delivery accessible through the faceplate;
an AC/DC converter disposed in the housing and configured to receive an AC signal from a connection to a source of AC mains power and to output a DC signal;
a first DC/DC converter disposed in the housing and configured to receive the DC signal and provide a first DC output signal having a first power to a first power delivery port;
a second DC/DC converter disposed in the housing and configured to receive the DC signal and provide a second DC output signal having a second power to a second power delivery port, wherein the first DC output signal is different from the second DC output signal;
a source controller configured to control the first DC/DC converter to vary the DC output signal and to control the second DC/DC converter to vary the second DC output signal.

2. The electrical wiring device of claim 1, wherein the source controller is configured to renegotiate the first power contract with the first device to a lower power upon determining that a sum of the first power contract and a power requirement of the second device exceed a maximum power suppliable.

3. The electrical wiring device of claim 1, wherein the first power delivery port is a first USB port, wherein the second power delivery port is a second USB port.

4. The electrical wiring device of claim 1, further comprising an electrical plug receptable accessible through the faceplate and configured to receive the AC signal from the connection to the source of AC mains power.

5. The electrical wiring device of claim 1, wherein the first AC/DC converter is a flyback converter.

6. The electrical wiring device of claim 1, further comprising a first switch in series with the first power delivery port, wherein the source controller is configured to enable or disable the first power delivery port according to a drive signal delivered to the first switch.

7. The electrical wiring device of claim 1, further comprising a second switch in series with the second power delivery port, wherein the source controller is configured to enable or disable the second power delivery port according to a drive signal delivered to the second switch.

8. The electrical wiring device of claim 1, further comprising a current sensor configured to generate a current sense signal representative of an amount of current drawn by the first device connected to the first power delivery port, wherein the source controller is further configured to operate at least one LED to indicate that the first device has a reached a predetermined charge when the current sense signal indicates that the amount of current drawn by the first device is below a predetermined threshold.

9. The electrical wiring device of claim 1, further comprising a thermistor disposed in proximity to the first power delivery port such that a resistance of the thermistor changes in response to a temperature change of the first power delivery port, wherein the source controller is configured to detect a value representative of the resistance of the thermistor and to change the first DC signal provided to the first power delivery port when the value representative of the resistance of the thermistor reaches a threshold.

* * * * *